United States Patent
Babkin et al.

(10) Patent No.: US 9,449,047 B2
(45) Date of Patent: Sep. 20, 2016

(54) DYNAMIC MODIFICATION OF SCHEMAS IN STREAMING DATABASES

(75) Inventors: Sergey Babkin, Scotch Plains, NJ (US); Jerry Baulier, Basking Ridge, NJ (US); Scott J. Kolodzieski, Chatham, NJ (US); Jon G. Riecke, Maplewood, NJ (US)

(73) Assignee: SYBASE, INC., Dublin, CA (US)

(*) Notice: Subject to any disclaimer, the term of this patent is extended or adjusted under 35 U.S.C. 154(b) by 1034 days.

(21) Appl. No.: 12/140,345

(22) Filed: Jun. 17, 2008

(65) Prior Publication Data

US 2009/0037769 A1    Feb. 5, 2009

Related U.S. Application Data

(60) Provisional application No. 60/944,921, filed on Jun. 19, 2007.

(51) Int. Cl.
    *G06F 7/00*     (2006.01)
    *G06F 17/30*    (2006.01)

(52) U.S. Cl.
    CPC ... *G06F 17/30516* (2013.01); *G06F 17/30292* (2013.01); *G06F 17/30595* (2013.01)

(58) Field of Classification Search
    CPC .............. G06F 17/30292; G06F 17/30516; G06F 17/30297
    USPC ................ 707/791, 803, 806, 807
    See application file for complete search history.

(56) References Cited

U.S. PATENT DOCUMENTS

| | | |
|---|---|---|
| 5,204,958 A | 4/1993 | Cheng et al. |
| 5,664,160 A | 9/1997 | Fecteau et al. |
| 5,778,370 A | 7/1998 | Emerson |
| 5,794,229 A | 8/1998 | French et al. |
| 5,812,130 A * | 9/1998 | Van Huben ........... G06Q 10/10 399/81 |
| 5,842,196 A | 11/1998 | Agarwal et al. |
| 5,873,097 A | 2/1999 | Harris et al. |
| 5,909,540 A | 6/1999 | Carter et al. |
| 5,918,225 A | 6/1999 | White et al. |
| 5,963,954 A | 10/1999 | Burrows |
| 5,996,054 A | 11/1999 | Ledain et al. |
| 6,003,039 A | 12/1999 | Barry et al. |
| 6,006,225 A | 12/1999 | Bowman et al. |
| 6,006,230 A | 12/1999 | Ludwig et al. |
| 6,009,432 A | 12/1999 | Tarin |
| 6,012,094 A * | 1/2000 | Leymann ............... G06F 9/466 707/999.202 |
| 6,014,670 A | 1/2000 | Zamanian et al. |
| 6,029,170 A | 2/2000 | Garger et al. |
| 6,035,306 A | 3/2000 | Lowenthal et al. |
| 6,044,374 A | 3/2000 | Nesamoney et al. |

(Continued)

OTHER PUBLICATIONS

Blakeley, et al., "Efficiently Updating Materialized Views," Proc. of SIGMOD, Washington. 1986, 11 pages.

(Continued)

*Primary Examiner* — Marc Somers
(74) *Attorney, Agent, or Firm* — Sterne, Kessler, Goldstein & Fox P.L.L.C.

(57) ABSTRACT

A method for dynamically modifying a database schema in a streaming database management system receives a new database schema, compares the new schema to an existing schema, identifies the differences between the new schema and the existing schema, and applies the identified differences to the database in a single transaction, thereby producing a database organized according to the new database schema.

22 Claims, 3 Drawing Sheets

(56) References Cited

U.S. PATENT DOCUMENTS

| | | | |
|---|---|---|---|
| 6,070,158 A | 5/2000 | Kirsch et al. | |
| 6,073,134 A | 6/2000 | Shoup et al. | |
| 6,073,140 A | 6/2000 | Morgan et al. | |
| 6,078,918 A | 6/2000 | Allen et al. | |
| 6,108,647 A | 8/2000 | Poosala et al. | |
| 6,108,659 A | 8/2000 | Vincent | |
| 6,119,128 A | 9/2000 | Courter et al. | |
| 6,161,103 A * | 12/2000 | Rauer et al. | |
| 6,189,004 B1 * | 2/2001 | Rassen et al. | |
| 6,230,166 B1 | 5/2001 | Velamuri et al. | |
| 6,286,005 B1 | 9/2001 | Cannon | |
| 6,341,288 B1 | 1/2002 | Yach et al. | |
| 6,377,948 B2 | 4/2002 | Kikuchi et al. | |
| 6,377,953 B1 | 4/2002 | Gawlick et al. | |
| 6,377,958 B1 | 4/2002 | Orcutt | |
| 6,405,187 B1 | 6/2002 | Egan et al. | |
| 6,405,208 B1 | 6/2002 | Raghavan et al. | |
| 6,408,292 B1 | 6/2002 | Bakalash et al. | |
| 6,411,950 B1 | 6/2002 | Moricz et al. | |
| 6,418,450 B2 | 7/2002 | Daudenarde | |
| 6,434,544 B1 | 8/2002 | Bakalash et al. | |
| 6,513,041 B2 | 1/2003 | Tarin | |
| 6,574,637 B1 | 6/2003 | Lindsey | |
| 6,633,883 B2 | 10/2003 | Koskas | |
| 6,694,325 B2 | 2/2004 | Jas | |
| 6,704,739 B2 | 3/2004 | Craft et al. | |
| 6,832,229 B2 | 12/2004 | Reed | |
| 6,839,714 B2 | 1/2005 | Wheeler et al. | |
| 6,839,759 B2 | 1/2005 | Larson et al. | |
| 6,880,007 B1 | 4/2005 | Gardos et al. | |
| 6,950,834 B2 | 9/2005 | Huras et al. | |
| 6,954,757 B2 | 10/2005 | Zargham et al. | |
| 6,993,504 B1 | 1/2006 | Friesen et al. | |
| 7,007,049 B2 | 2/2006 | Peng | |
| 7,031,974 B1 * | 4/2006 | Subramaniam | |
| 7,130,853 B2 | 10/2006 | Roller et al. | |
| 7,246,093 B1 | 7/2007 | Katz | |
| 7,249,118 B2 | 7/2007 | Sandler et al. | |
| 7,305,421 B2 | 12/2007 | Cha et al. | |
| 7,324,955 B1 | 1/2008 | Ford et al. | |
| 7,363,353 B2 | 4/2008 | Ganesan et al. | |
| 7,464,077 B1 * | 12/2008 | Baunach | G06F 17/30516 707/3 |
| 7,542,472 B1 * | 6/2009 | Gerendai | H04L 1/1635 370/338 |
| 7,672,934 B1 * | 3/2010 | Beatty | G06F 17/30595 707/999.003 |
| 7,716,182 B2 | 5/2010 | Tewksbary | |
| 7,734,604 B1 * | 6/2010 | Sinclair | G06F 17/30362 707/704 |
| 8,069,106 B2 | 11/2011 | Waelbroeck et al. | |
| 8,745,012 B2 | 6/2014 | Rusher et al. | |
| 2002/0029207 A1 | 3/2002 | Bakalash et al. | |
| 2003/0009411 A1 | 1/2003 | Ram et al. | |
| 2003/0078987 A1 | 4/2003 | Serebrennikov | |
| 2003/0110176 A1 * | 6/2003 | Morgan | G06F 17/30569 707/100 |
| 2003/0217033 A1 * | 11/2003 | Sandler et al. | 707/1 |
| 2004/0199905 A1 * | 10/2004 | Fagin et al. | 717/136 |
| 2005/0038818 A1 * | 2/2005 | Hooks | 707/104.1 |
| 2005/0050105 A1 * | 3/2005 | Idicula et al. | 707/200 |
| 2005/0071359 A1 * | 3/2005 | Elandassery et al. | 707/102 |
| 2006/0059065 A1 | 3/2006 | Glinberg et al. | |
| 2006/0104511 A1 * | 5/2006 | Guo et al. | 382/176 |
| 2006/0259458 A1 * | 11/2006 | Hunter et al. | 707/2 |
| 2007/0088726 A1 * | 4/2007 | Daos | G06F 17/30371 707/101 |
| 2007/0113031 A1 * | 5/2007 | Brown | G06F 12/023 711/160 |
| 2007/0203925 A1 | 8/2007 | Sandler et al. | |
| 2008/0086401 A1 | 4/2008 | Mather | |
| 2008/0115079 A1 | 5/2008 | Mather | |
| 2008/0134178 A1 | 6/2008 | Fitzgerald et al. | |
| 2008/0162494 A1 * | 7/2008 | Long et al. | 707/10 |
| 2008/0168109 A1 * | 7/2008 | Gaurav et al. | 707/203 |
| 2008/0288329 A1 | 11/2008 | Nannis et al. | |
| 2009/0037769 A1 | 2/2009 | Babkin et al. | |
| 2009/0076978 A1 | 3/2009 | Dayan | |
| 2009/0259598 A1 | 10/2009 | Stevens et al. | |

OTHER PUBLICATIONS

Blakeley, et al., "Updating Derived Relations: Detecting Irrelevant and Autonomously Computable Updates," ACM Transactions on Database Systems, vol. 14, No. 3, Sep. 1989, 34 pages.

Gupta, et al., "Maintaining Views Incrementally," ACM SIGMOD International Conference, Washington. D.C., May 1993, 10 pages.

Griffin. et al., "Incremental Maintenance of Views with Duplicates," Proc. of SIGMOD, 1995, 12 pages.

Quass, "Maintenance Expressions for Views with Aggregation," Proc. of SIGMOD, 1996, Workshop on Materialized Views, 9 pages.

Vista, "Optimizing Incremental View Maintenance Expressions in Relational Databases," 1996, 145 pages.

Zhao, et al., "On the Performance of an Array-Based ADT for OLAP Workloads," Aug. 29, 1996, 20 pages.

Zhao, et al., "Array-Based Evaluation of Multi-Dimensional Queries in Object-Relational Database Systems," Feb. 21, 1997, 18 pages.

"Warehouse Administrator's Guide for UNIX Platforms," Red Brick Warehouse, Version 5.1, Chapter 3, "Schema Design," Red Brick, Jan. 1998, 28 pages.

Dennis Shasha, "Time Series in Finance: the array database approach," VLDB Conference, Aug. 1998, 23 pages.

Zhao, et al., "Simultaneous Optimization and Evaluation of Multiple Dimensional Queries," Proc. ACM-SIGMOD, 1998, 10 pages.

Berry, et al., "Matrices, Vector Spaces, and Information Retrieval," SIAM Review, Apr. 23, 1999, vol. 41, No. 2, pp. 335-362.

"Multi-Dimensional Databases and Online Analytical Processing," Slide Presentation, 1999, 32 pages.

"Informix Red Brick Decision Server," Informix, Version 6.10, Technical Brief, 2000, 4 pages.

Sand Technology Library, "Nucleus Server White Paper," 2001, pp. 1-10.

Oracle, "Oracle9i Materialized Views," An Oracle White Paper, May 2001, 23 pages.

Purcell, et al., "Evolution of Star join Optimization," DB2 Universal Database for z/OS and OS/390, White Paper, Oct. 2001, 20 pages.

"Column-Based Analytical Technology: The Missing Piece of the Data Analytics Puzzle," Alterian, Oct. 2001, 19 pages.

"Nucleus Proves Itself a Super-Scalable iSeries Solution at the Teraplex," International Business Machines Corporation, 2001, 4 pages.

"Nucleus Executive Overview," Sand Technology, 2001, 4 pages.

"SAS/Warehouse Administrator 2.2 offers metadata-driven automation," SAS Institute Inc., 2001, www.sas.com.

"Project Proposal: Vector database engine," 2002.

"The IDUG Solutions Journal," Solutions Journal, vol. 9, No. 1, Mar. 2002, 8 pages.

Duval, et al., "Metadata Principles and Practicalities," D-Lib Magazine, vol. 8, No. 4, Apr. 2002, 11 pages.

Howard, "Aleri—An Evaluation by Bloor Research," Bloor Research, May 2, 2002, 7 pages.

Stata, et al., "The Term Vector Database: fast access to indexing terms for Web pages," Proc. of the 9th International World Wide Web Conference, Amsterdam, Netherlands, May 2002, 9 pages.

"Red Brick Warehouse," IBM Software, Downloaded from Web, Aug. 2002.

"Anglo Irish Bank," Decision Works Case Study, Decision Works, Downloaded from Web, Aug. 2002.

"innovations in data warehousing—Answering Complex, Real-Time and Dynamic Queries," Bloor Research, Aug. 2002.

"RODIN Data Warehousing," Downloaded from Web, Aug. 2002, 12 pages.

Palpanas, et al., "Incremental Maintenance for Non-Distributive Aggregate Functions," Proc. of VLDB Conference Hong Kong, Aug. 2002, 12 pages.

(56) References Cited

OTHER PUBLICATIONS

International Search Report for PCT/US03/15273 dated Jul. 10, 2003, 4 pages.
Chaudhuri, S. et al, "An overview of data warehousing and OLAP technology," SIGMOD Record, ACM, New York, NY, US, vol. 26, No. 1, Mar. 1997, 10 pages.
Page, Christopher R., "Configuring Database Systems," Proceedings of the Twelfth Systems Administration Conference (LISA '98), Boston, Massachusetts, Dec. 6-11, 1998, 13 pages.
Morzy, Tadeusz et al., "Optimizing Pattern queries for Web Access Logs," Springer Berlin/Heidelberg, vol. 2151, 2001, pp. 141-154.
Supplementary European Search Report for Application No. EP 03728933.7, date of completion Jan. 28, 2008, 3 pages.
Baulier, et al., "A Database System for Real-Time Event Aggregation in Telecommunication", Proceedings of the 24th VLDB Conference, pp. 680-684.
Baulier, et al., "DataBlitz Storage Manager: Main-Memory Database Performance for Critical Applications," Bell Laboratories, Murray Hill, ACM 1999, pp. 519-520.
Cranor, et al., "Gigascope: High Performance Network Monitoring with an SQL Interface", SIGMOD 2002, Jun. 3-6, 2002, p. 623.
Jagadish, et al., "Dali: A High Performance Main Memory Storage Manager", AT&T Bell Labs., Proceedings of the 20th VLDB Conference, Santiago, Chile, 1994, pp. 48-59.
Luckham, et al., "Complex Event Processing in Distributed Systems", Aug. 18, 1998, pp. 1-28.
Luckham, et al., "Specification and Analysis of System Architecture Using Rapide", IEEE Transactions on Software Engineering, vol. 21; No. 4, Apr. 1995, pp. 336-355.
Olson, et al., "Berkeley DB", Published in the Proceedings of the FREENIX Track: 1999 USENIX Annual Technical Conference, Jun. 6-11, 1999, 10 pages.
Ousterhout, et al., "Beating the I/O Bottleneck: A Case for Log-Structured File Systems", Oct. 30, 1988, pp. 11-28.
Rosenblum, et al., "The LFS Storage Manager", USENIX Summer Conference, Jun. 11-15, 1990, Anaheim, California, pp. 315-324.
Seltzer, et al., "An Implementation of a Log-Structured File System for UNIX", 1993 Winter USENIX, Jan. 25-29, 1993, San Diego, CA, pp. 307-326.
Seltzer, et al., "File System Logging Versus Clustering: A Performance Comparison", 1995 USENIX Technical Conference, Jan. 16-20, 1995, New Orleans, LA, pp. 249-264.
Snodgrass, et al., "A Taxonomy of Time in Databases", 1985 ACM, Mar. 1985, pp. 236-246.
Soules, et al., "Metadata Efficiency in Versioning File Systems", pp. 1-16.
Stonebraker, Michael, "The Design of the Postgres Storage System", Proceedings of the 13th VLDB Conference, Brighton 1987, pp. 289-300.
Varman, et al., "An Efficient Mutilversion Access Structure", IEEE Transactions on Knowledge and Data Engineering, vol. 9, No. 3, May/Jun. 1997, pp. 391-409.
International Search Report for PCT/US2009/040332 dated Jun. 19, 2009, 2 pages.
Final Office Action mailed Jul. 12, 2006, in U.S. Appl. No. 10/150,763, Sandler et al., filed May 17, 2002, 11 pages.
Non-Final Office Action mailed Oct. 14, 2006, in U.S. Appl. No. 10/150,763, Sandler et al., filed May 17, 2002, 7 pages.
Notice of Allowance mailed Nov. 7, 2006, in U.S. Appl. No. 10/150,763, Sandler et al., filed May 17, 2002, 9 pages.
Non-Final Office Action mailed Nov. 14, 2007, in U.S. Appl. No. 11/653,766, Sandler et al., filed Jan. 16, 2007, 6 pages.
Final Office Action mailed Jul. 18, 2008, in U.S. Appl. No. 11/653,766, Sandler et al., filed Jan. 16, 2007, 9 pages.
Non-Final Office Action mailed Mar. 29, 2011, in U.S. Appl. No. 12/188,665, Rusher et al., filed Aug. 8, 2008, 11 pages.
Final Office Action mailed Dec. 6, 2011, in U.S. Appl. No. 12/188,665, Rusher et al., filed Aug. 8, 2008, 13 pages.
Non-Final Office Action mailed Oct. 9, 2013, in U.S. Appl. No. 12/188,665, Rusher et al., filed Aug. 8, 2008, 12 pages.
Notice of Allowance mailed Mar. 19, 2014, in U.S. Appl. No. 12/188,665, Rusher et al., filed Aug. 8, 2008, 16 pages.
Non-Final Office Action mailed Mar. 18, 2011, in U.S. Appl. No. 12/422,050, Stevens et al., filed Apr. 10, 2009, 10 pages.
Final Office Action mailed Sep. 19, 2011, in U.S. Appl. No. 12/422,050, Stevens et al., filed Apr. 10, 2009, 12 pages.

\* cited by examiner

| 302 | 304 | 306 | 308 |
|---|---|---|---|
| (int32) | (string) | (double) | (int64) |
|  |  |  |  |
|  |  |  |  |

| 302 | 304 | 306 | 308 | 310 |
|---|---|---|---|---|
| (int64) | (string) | (double) | (int64) | (string) |
|  |  |  |  |  |
|  |  |  |  |  |

FIG. 3B

DYNAMIC MODIFICATION OF SCHEMAS IN STREAMING DATABASES

CROSS-REFERENCE TO RELATED APPLICATIONS

This application claims the benefit of and priority to U.S. Provisional Application Ser. No. 60/944,921, filed Jun. 19, 2007, the disclosure of which is hereby incorporated by reference in its entirety.

FIELD OF THE INVENTION

The invention relates to computer-based data processing, more particularly, to database management systems.

BACKGROUND OF THE INVENTION

Data in database management systems are typically stored in the form of records, or tuples, each composed of a fixed number of fields, also referred to as attributes. The fields of a record contain the data associated with that record. Frequently, database records are presented logically in the form of a table, with records as the rows of the table, and attributes as the columns. Systems typically store records in memory and/or on disk or other media as a linked list, with data for each record stored together.

The configuration of the data contained in a database is generally referred to as its "schema." Typically, a database schema includes a list of the tables used by an application or suite of applications, and describes the structure of each table as well as any constraints on the data stored in that table. For streaming database platforms in which data streams are analyzed and processed in real time, the streams may be considered as "materialized views," appearing as virtual tables, the contents of which are based on operations performed on other tables or views, and automatically change as the data in the underlying tables change. In streaming database implementations, the schema also includes the connections between the streams and tables, as well as the rules defining any dependencies among them.

From time to time, it may become necessary to update the schema due to changes in incoming data streams, new business rules, and/or updates to the applications using the data, as well as other reasons. The process of updating a database schema can be classified into one of two general categories: application-independent modifications or changes-in-place modifications.

Application-independent schema modifications are implemented by dividing the application into sub-applications that are not data-dependent, i.e., data from one sub-application is not used in, updated by, or provided to any other sub-applications, and each sub-application can be executed independently in parallel. As such, the portion of the schema for each sub-application can be considered an independent schema. Any modifications can be implemented by creating and destroying the portion(s) of the schema for the particular sub-application(s) of interest. As a schema gets destroyed (and possibly re-created in the modified form), only the affected sub-application(s) need be stopped. The rest of the application may continue, in some cases with limited functionality because the services provided by the stopped sub-application are unavailable. Typically, the destruction and re-creation of a sub-application schema involves unloading the data, destruction and re-creation of the schema with the changes, and reloading the data, possibly in a modified form to fit the new schema.

Changes-in-place schema modifications typically require stopping the entire application, unloading the data to some form of backup storage (e.g., files or temporary tables in the database or another database), deleting the schema, creating the new modified schema, reloading the data from the backup storage to the new schema (possibly including changes to the data to make it fit the new schema), and restarting the application. As a result, the application is not operating for an extended period of time while the changes are implemented.

In each case, changes to the schema or sub-schema must be atomic from the viewpoint of the application, that is, the application must see either the old schema or the new schema, but never a "change in progress" mix of the two. Because conventional database systems do not support transaction-based schema changes, this is difficult to achieve, and thus requires the application to be halted while the schema is being changed. Further, existing techniques require a "transitional program" that converts data from the formats defined in the old schema to that of the new schema. In any event, schema changes should be implemented such that the applications using the underlying data are affected as little as possible.

SUMMARY OF THE INVENTION

In view of the foregoing, there is a need for systems and methods to facilitate the application of database schema changes in streaming database systems such that interruptions to the streaming services and underlying applications are minimized, if not eliminated. Such techniques may be applied to a variety of streaming database and/or event processing database management systems, including, for example, the Aleri Streaming Platform, described in greater detail in U.S. patent application Ser. No. 10/150,763, entitled "Database Systems and Methods" and U.S. patent application Ser. No. 11/653,766, entitled "Database Systems and Methods," both of which are incorporated by reference herein in their entirety.

In general, in a first aspect, a method for dynamically modifying a database schema in a streaming database management system includes receiving a new database schema. Differences between the new schema and the existing schema are identified and are applied to the database in a single transaction, thereby producing a database organized according to the new database schema.

In various embodiments, the dynamic modification is atomic. Inputs to the database may be suspended during the application of the schema differences, and the suspended inputs may be limited to those inputs being affected by the changes. Data may be automatically converted, or may be converted with a conversion model, from a format compatible for the existing schema into a format compatible with the new schema. The converted data may be database records or database streams.

The existing schema, database data, and database streams may be backed up prior to the modification. Upon detection of an error during application of the identified schema differences, the application of the identified schema differences may be rolled back. One of the identified differences may include the removal of data from the existing schema, and further comprising removing the data.

In general, in a second aspect, a streaming database management system includes an interface for receiving user input and a database transaction module. The database transaction module compares a new database schema to an existing database schema, identifies differences between the new schema and the existing schema, and applies the identified differences to the database in a single transaction.

In various embodiments, the system features a database stream module for providing data to one or more data streams and/or a data store for backing up the transaction. The system may also feature a database client authorized for configuring the database.

DESCRIPTION OF THE INVENTION

In general, the present invention pertains, in various embodiments, to systems and methods for dynamic modification of a streaming database. To provide an overall understanding of the invention, certain illustrative embodiments are herein described, including systems and methods for applying changes to a schema of a streaming database in a single transaction.

Figure 1:
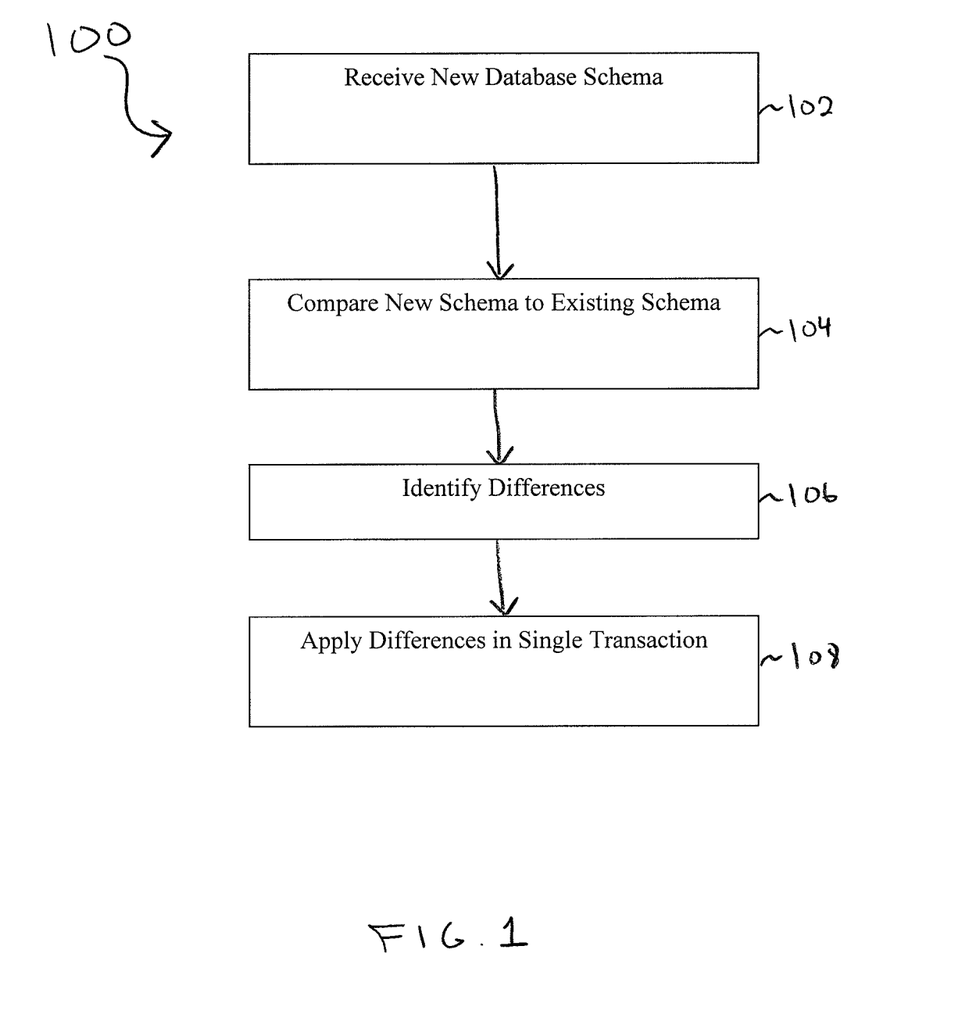
FIG. 1 is a flow chart illustrating one embodiment of a method for dynamic modification of a streaming database.

FIG. 1 depicts a flow chart 100 in accordance with some embodiments of the present invention. In brief overview, a new database schema is received (step 102) and compared to an existing schema (step 104). Next, differences between the existing schema and new schema are identified (step 106) and applied to the database in a single transaction (step 108), thereby producing a database organized according to the new database schema.

Turning to step 102, now in greater detail, a schema change request indicating the need for the new schema (including, in some cases, any new calculation rules), is received by a streaming database system. The change request may be in the form of a configuration file, which may be written in XML or any other suitable language, script, or format. The configuration file may be present on the streaming platform or on a client authorized to configure the streaming platform. If, as the configuration file is parsed, it is determined to be invalid, the process 100 may halt and return an error message, any may also write the error message to a log file. The streaming platform system may parse the configuration file for, among other things, self-consistency.

In step 104, now in greater detail, the new schema is compared to the existing schema, and in step 106, differences between the existing schema and the new schema are identified. The input data streams may be suspended, and in some embodiments a backup of any persistent stores may be performed. If only a subset of the input data streams is affected by the differences, only those inputs may be suspended and backed up. The comparison may determine that the changes to the existing schema that are needed to implement the new schema may occur while the streaming database system is running. In alternative embodiments, the changes to the existing schema may require that the streaming database system be shut down before the changes are applied, and then restarted.

In step 108, now in greater detail, differences are applied to the streaming database in a single transaction, which may be an atomic transaction. In some embodiments, data configured for the existing schema may be automatically converted to match the new schema. In these embodiments, the differences may not significantly change the structure of the data within the schema. A separate system accessing the data, for example, may note the lack of any changes in the structure of the records or fields of the new schema, even though the data within the records and fields may be different. In certain embodiments, the streaming database system contains some or all of the calculation rules that define materialized views within its schema, and the system includes checks to ensure that newly generated data that matches the new schema format can be regenerated automatically from the existing data. As a result, no separate conversion programs or explicit unloading and loading of data may be required. In some embodiments, the streaming database system may be configured to accept only new schemas that have differences of this type only.

In other embodiments, the differences are more extensive, and may affect aspects of the schema such as, for example, the number of fields in a table, such that the data in the existing schema cannot be automatically generated or converted to the structure of the new schema. The data in the portions of the schema affected by these differences may be deleted and created anew from scratch.

In some embodiments, a conversion model—a small, discrete model isolated from the existing database schema—is instantiated to perform the processing needed to convert the existing data to match the new schema. The data may be in the form of an entry in a database, or may be a stream of data. Such a data stream may be a stream receiving data from outside the application or database schema—a "base stream." In some embodiments, the data in a base stream cannot be regenerated after it has been converted. The data in the base stream may be preserved before it is converted and may be restored if, for example, the conversion fails.

In some embodiments, the conversion model may not convert all of the data contained in the database. The data not converted by the conversion model may be copied to the new schema in an unconverted format, automatically converted, or discarded. Use of the conversion model may preclude the need to process the data outside of the streaming database. Instead, the data may be kept on the streaming database system and converted to match the new schema by instantiating the conversion model into the streaming database system. In some embodiments, the conversion schema and model may be used not only on the streaming databases but also on standard, non-streaming databases.

The data to be converted may first be copied from the relevant portion of the existing schema into to the conversion model. The model holding the existing schema may then be suspended while the conversion model executes and converts the copied data into a format compatible with the new schema. Once the existing schema has been modified to comply with the new schema, the converted data may be copied from the conversion model to the new schema. The conversion model may be deleted once the data has been copied. In alternate embodiments, the converted data is stored outside the conversion model such that the conversion model may be deleted before the existing schema has been modified. If the conversion fails at any point, the entire modification may be rolled back and rejected, and the existing schema is used.

If the data to be converted is defined as part of a base stream, a command may first be sent to the other systems connected to the stream, telling those systems to disconnect from the stream. Once the data in the base stream has been converted to match the new schema, a new stream may be created to receive and/or process the data. A disconnected system may then re-connect to the new stream.

In some embodiments, the new configuration may contain new object definitions, and if so, these are created and compiled during the conversion process. Conversely, in some embodiments, the existing configuration may contain data that does not fit into the new schema, and such data may be discarded. The streaming database platform, however, may try to save as much of this data as is possible. For example, if a column changes names from the existing schema to the new schema, the streaming database platform will preserve the data contained in the column.

If any of the existing streams are modified, the modifications are applied and compiled into the internal executable format. If streams are deleted, an end-of-data indication may be sent to the application(s) using the deleted streams. If any existing stream is modified in a way that changes its row definition (or other such basic characteristic), it may be implemented by first being deleted and then re-created by, for example, sending an end-of-data indication to the application(s) using the stream, and associating the stream name with a new internal identifier. The entire modification is applied as a single transaction, that is if any process fails to compile, the whole modification is rolled back and rejected. Optionally, parts of the model that are not affected by the change can continue to process.

Figure 2:
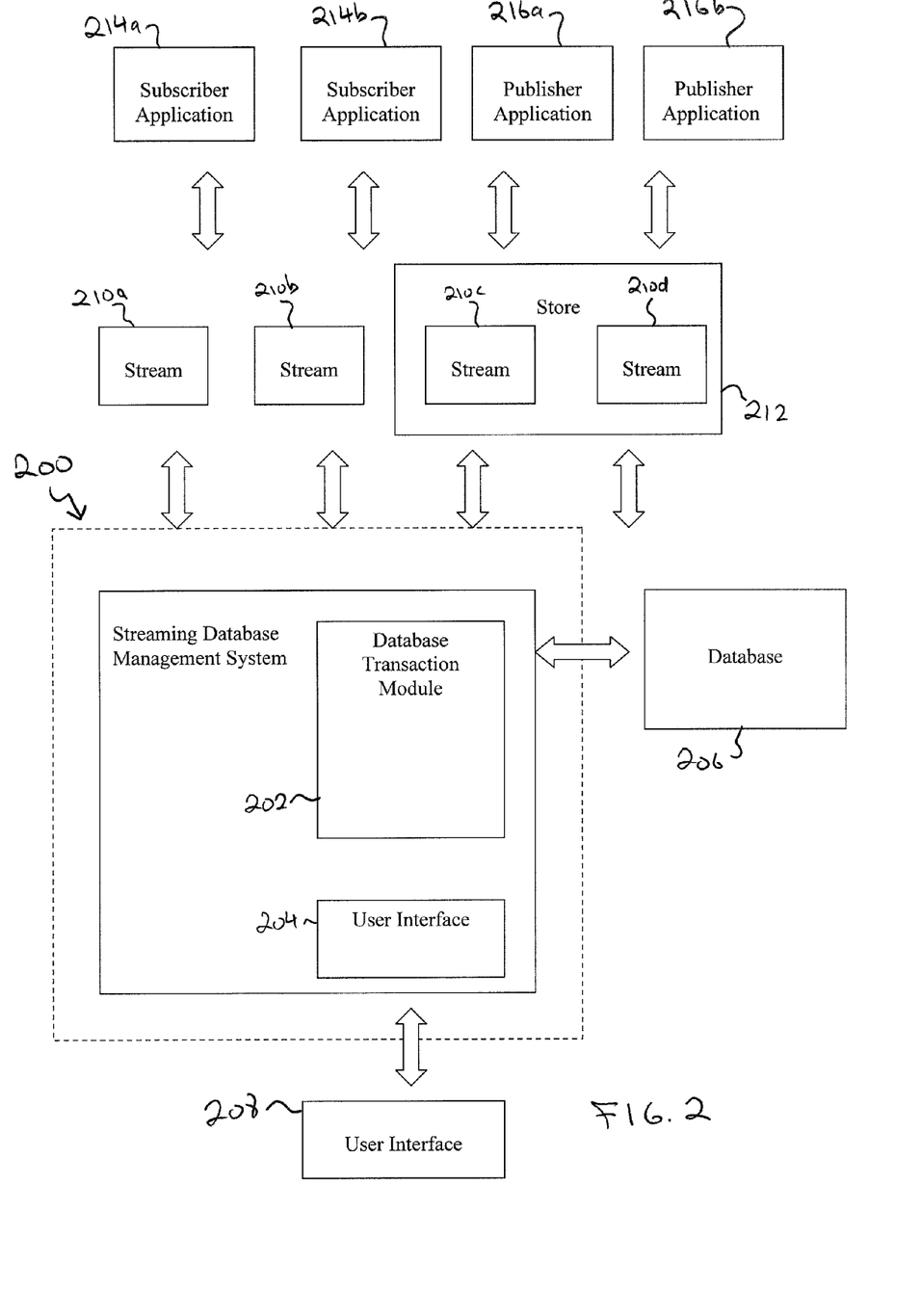
FIG. 2 illustrates an embodiment of a streaming database configured for dynamic modification.

Further, by using the techniques described herein, there is no effect on the parts of the application (e.g., sub-applications) that use portions of the schema for which the row definitions remain unchanged. The sub-applications can continue to function transparently after the schema change is applied and do not require a new database connection after the change. Even if the data contained in the tables changes, the changes may be transmitted to the application as normal streaming updates. With reference to FIG. 2, one embodiment of a streaming database management system 200 is shown. The streaming database management system 200 may include a database transaction module 202 and a user interface module 204. In some embodiments, the database transaction module 202 compares a new database schema to an existing database schema, identifies the differences between the new schema and the existing schema, and applies the identified differences to a database 206 in a single transaction. The new database schema may be received by the user interface module 204 from the user interface 208. The streaming database management system 200 may also include a data store, which may be used to back up data affected by the identified differences.

The streaming database management system 200 may communicate with streams of data 210a-d. Some of the streams, for example streams 210c-210d, may be located inside a store 212. Applications 214a-b, 216a-b may read or write ("subscribe" or "publish") data to the streams 210a-b. For example, subscriber application 214b may read data from stream 210b, and publisher application 216b may write data to stream 210c.

Figure 3A:
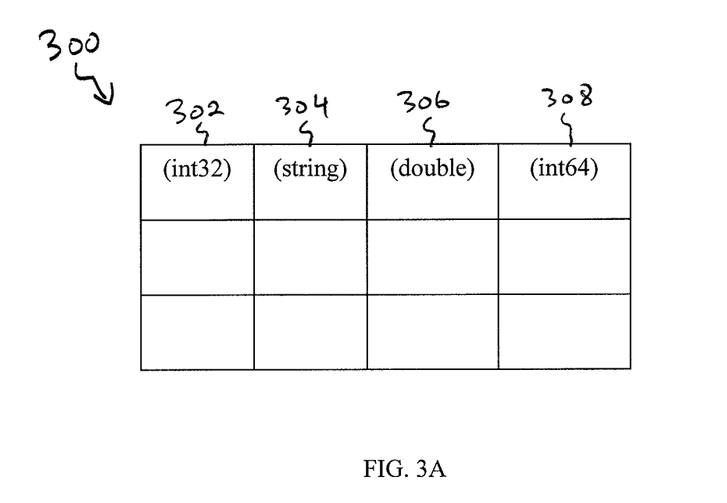
FIG. 3 illustrates an exemplary database table modified by a system or method in accordance with an embodiment of the present invention.
Figure 3B:
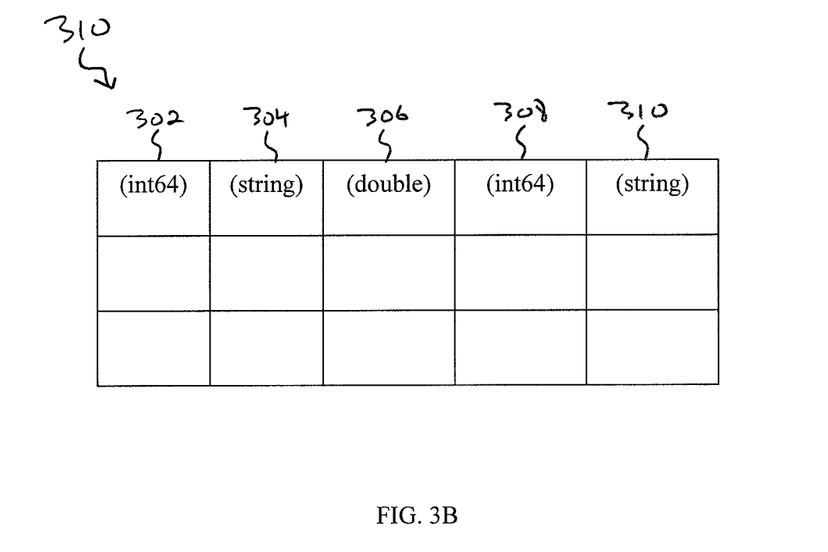

FIGS. 3A and 3B depict a database table before and after, respectively, a modification is made to the table's schema in accordance with an embodiment of the present invention. FIG. 3A shows a table 300 with columns 302-308. A first column 302 may contain data of type int32, a second column 304 may contain data of type string, a third column 306 may contain data of type double, and a fourth column 308 may contain data of type int64. FIG. 3B shows the resultant table 310 after a schema modification has been carried out by, for example, the process described in flow chart 100. The data type of the first column 302 has been changed from int32 to int64, and a fifth column 312 has been added that contains data of type string.

The new table 310 may have been created from the existing table 300 without stopping a streaming database management system 200 that holds a representation of the existing table 300. For example, a conversion model may have been instantiated to convert the int32 data of the first column 302 of the existing table 300 to the int64 data of the first column 302 of the new table 310. In some embodiments, the int32 data may have been automatically converted to int64 data according to a predefined algorithm. In alternative embodiments, the int32 data is copied directly from the existing table 300 to the new table 310 without any conversion. Similarly, the new column 312 in the new table 310 may have been filled automatically with, for example, empty strings.

Many alterations and modifications may be made by those having ordinary skill in the art without departing from the spirit and scope of the invention. Therefore, it must be expressly understood that the illustrated embodiments has been shown only for the purposes of example and should not be taken as limiting the invention. The invention should therefore be read to include all equivalent elements for performing substantially the same function in substantially the same way to obtain substantially the same result, even though not identical in other respects to what is shown and described in the above illustrations.

What is claimed is:

1. A method for dynamically modifying a database schema in a streaming database management system, the method comprising:
receiving a new database schema, wherein upon receipt the new database schema is determined to be valid;
comparing the new database schema to an existing database schema of a database in the streaming database management system, the database having a plurality of data streams as inputs;
identifying differences between the new database schema and the existing database schema based on the comparing;
determining that a particular data stream fits in the existing database schema and does not fit into the new database schema;
deleting the particular data stream;
providing an end-of-data indication to one or more applications using the deleted stream;
re-creating the particular data stream using a new identifier upon a determination that the particular data stream is modified;
instantiating a conversion model of the new database schema;
copying data of the database, with the existing database schema, into the conversion model;
converting the copied data into a format compatible with the new database schema;
modifying the database in accordance with the new database schema in a single transaction, wherein a plurality of modifications to the existing database schema are applied as a single transaction upon successful compilation of the each of the plurality of modifications, and none of the plurality of modifications of the dynamic modification are applied upon unsuccessful compilation of any of the plurality of modifications to the existing database schema; and copying the converted data from the conversion model to the modified database, wherein data corresponding to the particular data stream is not stored in the modified database.

2. The method of claim 1, wherein inputs to the database are suspended during the modifying.

3. The method of claim 2, wherein the suspended inputs are limited to those inputs being affected by the changes, wherein one or more inputs affected by the changes are suspended and one or more inputs not affected by the changes are not suspended.

4. The method of claim 1, wherein the converting comprises automatically converting a selected data stream formatted for the existing database schema into a format compatible with the new database schema.

5. The method of claim 1, wherein the instantiating comprises instantiating the conversion model based on the identified schema differences, the conversion model organized according to the new database schema and including at least one data stream selected from the plurality of data streams of the database to convert data formatted for the existing database schema into a format compatible with the new database schema.

6. The method of claim 5, further comprising converting data in database records into a format compatible with the new database schema.

7. The method of claim 5, further comprising converting data in each of the plurality of data streams into a format compatible with the new database schema.

8. The method of claim 1, further comprising backing up the existing database schema prior to the modifying.

9. The method of claim 8, further comprising backing up data in each of the plurality of data streams.

10. The method of claim 1, further comprising, upon detection of an error during application of the identified schema differences, rolling back the copying of the converted data.

11. The method of claim 1, wherein one of the identified differences includes the removal of data from the existing database schema, and further comprising removing the data.

12. The method of claim 1, wherein the receiving comprises:
receiving a configuration file including the new database schema; and
determining whether the configuration file is invalid, wherein if the configuration file is invalid: halting of the dynamic comparison of the database, and returning of an error message.

13. The method of claim 12, wherein the determining whether the configuration file is invalid comprises:
parsing the configuration file for self-consistency; and
determining that the configuration file is inconsistent based on the parsing.

14. The method of claim 1, further comprising;
deleting the conversion model after the copying has been performed.

15. The method of claim 1, wherein the determining the particular data stream comprises:
determining data of the database that fits in the existing database schema that does not fit in the new database schema; and
wherein the copying comprises copying the data of the database excluding the data that does not fit in the new database schema into the modified database.

16. A computer-implemented streaming database management system, the system comprising:
a processor; and
a memory having processor readable instructions that when executed by the processor implement:
an interface for receiving user input; and
a database transaction module operable to perform operations, including:
receiving a new database schema, wherein upon receipt the new database schema is determined to be valid upon receipt;
comparing the new database schema to an existing database schema of a database in the streaming database management system,
the database having a plurality of data streams as inputs;
identifying differences between the new database schema and the existing database schema based on the comparing;
determining that a particular data stream fits in the existing database schema and does not fit into the new database schema;
deleting the particular data stream;
providing an end-of-data indication to one or more applications using the deleted stream;
re-creating the particular data stream using a new identifier upon a determination that the particular data stream is modified;
instantiating a conversion model of the new database schema;
copying data of the database, with the existing database schema, into the conversion model;
converting the copied data into a format compatible with the new database schema;
modifying the database in accordance with the new database schema in a single transaction, wherein a plurality of modifications to the existing database schema are applied as a single transaction upon successful compilation of the each of the plurality of modifications, and none of the plurality of modifications of the dynamic modification are applied upon unsuccessful compilation of any of the plurality of modifications to the existing database schema; and
copying the converted data from the conversion model to the modified database, wherein data corresponding to the particular data stream is not stored in the modified database.

17. The system of claim 16, further comprising a database stream module for providing data to one or more data streams in the plurality of data streams.

18. The system of claim 16, further comprising a data store for backing up the transaction.

19. The system of claim 16, further comprising a database client authorized for configuring the database.

20. The system of claim 16, wherein the database transaction module configured to perform the determining is configured to perform the operations comprising:
receiving a configuration file including the new database schema; and
determining whether the configuration file is invalid, wherein if the configuration file is invalid: halting of the dynamic comparison of the database, and returning of an error message.

21. The system of claim 20, wherein the database transaction module configured to determine whether the configuration file is invalid is configured to perform the operations comprising:
parsing the configuration file for self-consistency; and determining that the configuration file is inconsistent based on the parsing.

22. A non-transitory tangible computer-readable device having instructions stored thereon that, when executed by at least one computing device, causes the at least one computing device to perform operations comprising:

receiving a new database schema, wherein upon receipt the new database schema is determined to be valid;

comparing the new database schema to an existing database schema of a database in the streaming database management system, the database having a plurality of data streams as inputs;

identifying differences between the new database schema and the existing database schema based on the comparing;

determining that a particular data stream fits in the existing database schema and does not fit into the new database schema;

deleting the particular data stream;

providing an end-of-data indication to one or more applications using the deleted stream;

re-creating the particular data stream using a new identifier upon a determination that the particular data stream is modified;

instantiating a conversion model of the new database schema;

copying data of the database, with the existing database schema, into the conversion model;

converting the copied data into a format compatible with the new database schema;

modifying the database in accordance with the new database schema in a single transaction, wherein a plurality of modifications to the existing database schema are applied as a single transaction upon successful compilation of the each of the plurality of modifications, and none of the plurality of modifications of the dynamic modification are applied upon unsuccessful compilation of any of the plurality of modifications to the existing database schema; and copying the converted data from the conversion model to the modified database, wherein data corresponding to the particular data stream is not stored in the modified database.

* * * * *